United States Patent
Kawamata et al.

(10) Patent No.: US 9,304,004 B2
(45) Date of Patent: Apr. 5, 2016

(54) MAP UPDATE SERVER, MAP UPDATE SYSTEM, AND CAR NAVIGATION SYSTEM

(75) Inventors: Yukihiro Kawamata, Hitachi (JP); Yukio Miyazaki, Hitachinaka (JP); Takayuki Uchida, Hitachi (JP)

(73) Assignees: Hitachi, Ltd., Tokyo (JP); Clarion Co., Ltd., Tokyo (JP)

( * ) Notice: Subject to any disclaimer, the term of this patent is extended or adjusted under 35 U.S.C. 154(b) by 896 days.

(21) Appl. No.: 12/356,892

(22) Filed: Jan. 21, 2009

(65) Prior Publication Data

US 2009/0187336 A1 Jul. 23, 2009

(30) Foreign Application Priority Data

Jan. 22, 2008 (JP) ................. 2008-011598

(51) Int. Cl.
*G01C 21/32* (2006.01)
(52) U.S. Cl.
CPC ...................... *G01C 21/32* (2013.01)
(58) Field of Classification Search
CPC ........................................................ G01C 21/32
See application file for complete search history.

(56) References Cited

U.S. PATENT DOCUMENTS

| 7,490,006 | B2 | 2/2009 | Sekine et al. | |
| 2006/0173614 | A1* | 8/2006 | Nomura | 701/210 |

FOREIGN PATENT DOCUMENTS

| EP | 1 562 021 A1 | 8/2005 |
| EP | 1 691 168 A1 | 8/2006 |
| JP | 2006-251768 A | 9/2006 |

OTHER PUBLICATIONS

Extended European Search Report dated Dec. 13, 2013 (seven (7) pages).

* cited by examiner

*Primary Examiner* — Ryan Zeender
*Assistant Examiner* — H Rojas
(74) *Attorney, Agent, or Firm* — Crowell & Moring LLP

(57) ABSTRACT

An update information providing server for providing data of an updated portion in map data composed of plural kinds of the data includes: a map data storage unit configured to store incremental update data of a difference between the data at a predefined time and newest data, and a data size of the incremental update data; an update request receiving unit configured to receive from a user terminal a map data update request including a capacity of a recording medium, and priority information for specifying a data kind of the data to be preferentially updated; an update order information making unit configured to make update order information; an update information transmission unit configured to extract the incremental update data from the storage unit, to make update information including the extracted incremental update data and the update order information, and to transmit the made update information to the user terminal.

4 Claims, 16 Drawing Sheets

| Data Kind | Route Calculate Priority | Map Drawing Priority | Address Search Priority | Establishment Search Priority |
|---|---|---|---|---|
| Route Calculate Data | 1 | 3 | 3 | 3 |
| Map Drawing Data | 3 | 1 | 2 | 2 |
| Guidance Data | 2 | 4 | 4 | 4 |
| Address Search Data | 4 | 5 | 1 | 5 |
| Establishment Data | 5 | 6 | 5 | 1 |
| Icon Data | 6 | 2 | 6 | 6 |

| Data Kind | Route Calculate Priority | Map Drawing Priority | Address Search Priority | Establishment Search Priority |
|---|---|---|---|---|
| Route Calculate Data | 1 | 3 | 3 | 3 |
| Map Drawing Data | 3 | 1 | 2 | 2 |
| Guidance Data | 2 | 4 | 4 | 4 |
| Address Search Data | 4 | 5 | 1 | 5 |
| Establishment Data | 5 | 6 | 5 | 1 |
| Icon Data | 6 | 2 | 6 | 6 |

FIG.6

| Data Kind | Data Size | Flag |
|---|---|---|
| Route Calculate Data | 50MB | 0 |
| Map Drawing Data | 20MB | 0 |
| Guidance Data | 30MB | 0 |
| Address Search Data | 10MB | 0 |
| Establishment Data | 10MB | 0 |
| Icon Data | 10MB | 0 |
| Sum | 130MB | |

| Data Kind | Data Size | Flag |
|---|---|---|
| Route Calculate Data | 220MB | 1 |
| Map Drawing Data | 20MB | 0 |
| Guidance Data | 30MB | 0 |
| Address Search Data | 10MB | 0 |
| Establishment Data | 10MB | 0 |
| Icon Data | 10MB | 0 |
| Sum | 300MB | |

| Data Kind | Data Size | Flag |
|---|---|---|
| Route Calculate Data | 220MB | 1 |
| Map Drawing Data | 20MB | 0 |
| Guidance Data | 100MB | 1 |
| Address Search Data | 10MB | 0 |
| Establishment Data | 10MB | 0 |
| Icon Data | 10MB | 0 |
| Sum | 370MB | |

| Data Kind | Data Size | Flag |
|---|---|---|
| Route Calculate Data | 220MB | 1 |
| Map Drawing Data | 400MB | 1 |
| Guidance Data | 100MB | 1 |
| Address Search Data | 10MB | 0 |
| Establishment Data | 10MB | 0 |
| Icon Data | 10MB | 0 |
| Sum | 750MB | |

510 / 511 / 512

50 Update Order Information

| Data Kind | Flag |
|---|---|
| Route Calculate Data | 1 |
| Guidance Data | 1 |
| Map Drawing Data | 0 |
| Address Search Data | 0 |
| Establishment Data | 0 |
| Icon Data | 0 |

| Area Name | Sub-Area Name | Mesh ID |
|---|---|---|
| AAA | aaa | M001 |
|  |  | M002 |
|  |  | ⋮ |
|  | bbb | M101 |
|  |  | M102 |
|  |  | ⋮ |
| ⋮ | ⋮ | ⋮ |

Operation Flow of Update Information Providing Server 20

Operation Flow of Navigation System 40

| Line Kind | Average Communication Speed |
|---|---|
| XXX | 1Mbps |
| YYY | 2Mbps |
| ZZZ | 500kbps |
| ⋮ | ⋮ |

Operation Flow of Navigation System 40'

MAP UPDATE SERVER, MAP UPDATE SYSTEM, AND CAR NAVIGATION SYSTEM

BACKGROUND OF THE INVENTION

1. Field of the Invention

The present invention relates to an update technology of map data stored in a car navigation system mounted on a mobile object such as a vehicle.

2. Description of the Related Art

In a car navigation system which performs a navigation using map data stored therein, it is necessary to update the map data according to the change of a map environment such as a new road being built or a new establishment being constructed. The newest map data is provided in some cases by either the newest map data itself or incremental update data between old map data and the newest one.

Because the incremental update data is composed of a difference between old map data and the newest one, it is smaller in many cases than the newest map data itself in a data size. However, because a car navigation system having received the incremental update data is required to perform a process of making the newest map data from the incremental update data and the old map data, it takes in some cases a long time and high processing load in updating the map data.

Consequently, according to Japanese Patent Laid-Open Publication No. 2006-251768, map data is composed of a plurality of files, and a ratio of a data size of a difference file to that of an updated file is calculated for every file; when the ratio is less than a predetermined ratio (for example, less than 10%), the difference file is provided; and when the ratio is not less than the predetermined ratio, the updated file is provided as it is.

In the meantime, when a data amount of map data to be updated is large, even if not incremental update data but updated map data itself is provided, it takes in some cases several ten minutes in updating. Furthermore, when a car navigation system updates the map data, in some cases the system stops all functions of using the map data until updating all map data is completed.

However, with respect to the map data, a data kind of data used is different in some cases according to a function: such as data used in a route calculate function; data used in a map drawing function; and data used in an address search function. Therefore, it is convenient for a user if a function that he/she wants to use is updated in order, and if the function using data in order from the data of a data kind whose updating is completed can be activated Consequently, there is a need for updating map data in a car navigation system in order from a data kind of data designated by a user.

SUMMARY OF THE INVENTION

In order to solve the above mentioned problems, with respect to map data composed of plural kinds of data, the present invention makes update order information for indicating to update in order from a data kind of data designated by a user, and makes a car navigation system update the map data in order according to the update order information.

For example, a first aspect of the present invention is an update information providing server configured to provide data of an updated portion in map data composed of plural kinds of the data, and the server comprises: a map data storage unit configured to store incremental update data of a difference between the data at a predefined time and newest data, and a data size of the incremental update data, for every data kind indicating a data kind of each piece of the data included in the map data; an update request receiving unit configured to receive from a user terminal a map data update request including a capacity of a recording medium where update information is stored, and priority information for specifying the data kind of the data to be preferentially updated; an update order information making unit configured to specify the incremental update data for the every data kind in the map data storage unit when the update request receiving unit receives the map data update request, and to make update order information for specifying an update order of the data kind and indicating to update in order from the data of the data kind specified by the priority information included in the map data update request when a total amount of the specified incremental update data is less than the capacity of the recording medium included in the map data update request; an update information transmission unit configured to extract the incremental update data for the every data kind from the map data storage unit, to make update information including the extracted incremental update data and the update order information, and to transmit the made update information to the user terminal.

Furthermore, a second aspect of the invention is an update information providing system comprising: an update information providing server configured to provide data of an updated portion in map data composed of plural kinds of the data; and a user terminal configured to acquire the updated portion of the map data from the update information providing server and to record the updated portion in a recording medium; and the user terminal comprises: an acceptance unit configured to accept priority information for specifying a data kind of the data to be preferentially updated; a capacity detection unit configured to detect a remaining capacity of the recording medium attached; an update request transmission unit configured to make and transmit an update order request including the priority information accepted by the acceptance unit and the remaining capacity detected by the capacity detection unit to the update information providing server; and an update information recording unit configured to record the received update information in the attached recording medium when the user terminal receives from the update information providing server the update information including incremental update data of a difference between the data at a predefined time and newest data, and the update order information for defining an order of the data kind to be updated for every data kind for indicating the data kind of each piece of the data included in the map data; and the update information providing server comprises: a map data storage unit configured to store incremental update data and a data size thereof; an update request receiving unit configured to receive an update request from the user terminal; an update order information making unit configured to specify the incremental update data for the every data kind in the map data storage unit when the update request receiving unit receives the map data update request, and to make update order information for indicating to update in order from the data of the data kind specified by the priority information included in the map data update request when a total amount of the specified incremental update data is less than the capacity of the recording medium included in the map data update request.

Furthermore, a third aspect of the invention is a car navigation system mounted on a vehicle, and the system comprises: a map data storage unit configured to store map data associated with a data kind for every data kind indicating the data kind of each piece of data included in map data; a navigation processing unit configured to perform a process of using the map data associated with the data kind for every data kind in the map data stored in the map data storage unit; a map data update unit configured to update the map data in the map data storage unit with incremental update data for the every data kind in order listed in update order information when a recording medium is attached where update information including the incremental update data of a difference between the data at a predefined time and newest data for the every data kind, and update order information for defining an order of the data kind to be updated is recorded; and a control unit configured to prohibit a process by the navigation processing unit when the recording medium is attached, and to permit the process of the navigation processing unit using the map data associated with the data kind for the every data kind in the map data of the updated data kind every time when the map data is updated for the every data kind by the map data update unit.

Furthermore, a fourth of the present invention is an update information providing server configured to provide data of an updated portion in map data composed of plural kinds of the data, and the server comprises: a map data storage unit configured to store incremental update data of a difference between the data at a predefined time and newest data, and a data size of the incremental update data, for every data kind indicating a data kind of each piece of the data included in the map data; a communication speed information storage unit configured to store in advance an average communication speed in a communication line for a line kind indicating a kind of the communication line; an update request receiving unit configured to receive from a car navigation system a map data update request including the line kind and priority information for specifying the data kind of the data to be preferentially updated; an update order information making unit configured to refer the communication speed information storage unit, to specify a communication speed associated with the line kind included in the map data update request, to calculate a communication data size of a transmittable data size for a predefined time in the specified communication speed, and to specify incremental update data for the every data kind in the map data storage unit when the update request receiving unit receives the map data update request, and to make update order information for specifying an update order of the data kind and indicating to update in order from the data of the data kind specified by the priority information included in the map data update request when a total amount of the specified incremental update data is less than a capacity of the calculated communication data size; an update information transmission unit configured to extract the incremental update data for the every data kind from the map data storage unit, to make update information including the extracted incremental update data and the update order information, and to transmit the made update information to the user terminal.

Furthermore, a fifth aspect of the invention is an update information providing system comprising: an update information providing server configured to provide data of an updated portion of map data; and a car navigation system configured to acquire the updated portion of the map data from the update information providing server and to hold the updated portion in the map data composed of plural kinds of data; and the navigation system comprises: a first map data storage unit configured to store the map data associated with a data kind for every data kind for indicating the data kind of each piece of the data included in the map data; a navigation processing unit configured to perform a process of using the map data associated with the data kind for the every data kind in the map data stored in the first map data storage unit; a communication unit configured to communicate with the update information providing server through a radio communication; an acceptance unit configured to accept priority information from a user for specifying the data kind of the data to be preferentially updated; an update request transmission unit configured to make a map data update request including the priority information accepted by the acceptance unit and a line kind for indicating a kind of a communication line used by the communication unit according to an instruction from a user and to transmit the made map data update request to the update information providing server through the communication unit; and a map data update unit configured to update the map data in the first map data storage unit with incremental update data for the every data kind in order listed in update order information when the control unit receives update information from the update information providing server through the communication unit, including the incremental update data of a difference between the data at a predefined time and newest data for the every data kind, and the update order information for defining an order of the data kind to be updated; and a control unit configured to prohibit a process by the navigation processing unit when the control unit receives the update information through the communication unit, and to permit the process of the navigation processing unit using the map data associated with the data kind for the every data kind in the map data of the updated data kind every time when the map data is updated for the every data kind by the map data update unit; and the update information providing server comprises: a second map data storage unit configured to store the incremental update data and a data size thereof for the every data kind; a communication speed information storage unit configured to store in advance an average communication speed in a communication line for every line kind; an update request receiving unit configured to receive a map data update request from the navigation system; an update order information making unit configured to refer the communication speed information storage unit, to specify a communication speed associated with the line kind included in the map data update request, to calculate a communication data size of a transmittable data size for a predefined time in the specified communication speed, and to specify incremental update data for the every data kind in the second map data storage unit when the update request receiving unit receives the map data update request, and to make update order information for indicating to update in order from the data of the data kind specified by the priority information included in the map data update request when a total amount of the specified incremental update data is less than a capacity of the calculated communication data size; and an update information transmission unit configured to extract the incremental update data for the every data kind from the second map data storage unit, to make update information including the extracted incremental update data and the update order information, and to transmit the made update information to the navigation system, Furthermore, a sixth aspect of the invention is a car navigation system mounted on a vehicle, and the system comprises: a map data storage unit configured to store map data associated with a data kind for every data kind indicating the data kind of each piece of data included in the map data; a navigation processing unit configured to perform a process of using the map data associated with the data kind for the every data kind in the map data stored in the map data storage unit; a communication unit configured to communicate with an update information providing server configured to provide the map data of an updated portion through a radio communication; an acceptance unit configured to accept, from a user, priority information for specifying the data kind of data to be preferentially updated; an update request transmission unit configured, according to an user's instruction, to make a map data update request including the priority information accepted by the acceptance unit and a line kind for indicating a kind of a communication line used by the communication unit, and to transmit the made map data update request to the update request providing server through the communication unit; a map data update unit configured to update the map data in the map data storage unit with incremental update data for every data kind in order listed in update order information when the map data update unit receives update information including the incremental update data of a difference between data at a predefined time and newest data for the every data kind, and the update order information for defining an order of the data kind of the data to be updated from the update information providing server through the communication unit; a map data update unit configured to update the map data in the map data storage unit with the incremental update data for the every data kind; and a control unit configured to prohibit a process by the navigation processing unit when the control unit receives the update information from the update information providing server, and to permit the process of the navigation processing unit using the map data associated with the data kind for the every data kind in the map data of the updated data kind every time when the map data is updated for the every data kind by the map data update unit.

According to the present invention, it is possible to update map data in a car navigation system in order from data of a data kind designated by a user.

BRIEF DESCRIPTION OF THE DRAWINGS

FIG. 6 is a conceptual drawing illustrating a process of update data being selected by an update order information making unit.

FIG. 7 is a conceptual drawing illustrating a process of update data being selected by the update order information making unit.

FIG. 8 is a conceptual drawing illustrating a process of update data being selected by the update order information making unit.

FIG. 9 is a conceptual drawing illustrating a process of update data being selected by the update order information making unit.

BEST MODE FOR CARRYING OUT THE INVENTION

Here will be described a first embodiment of the present invention.

Figure 1:
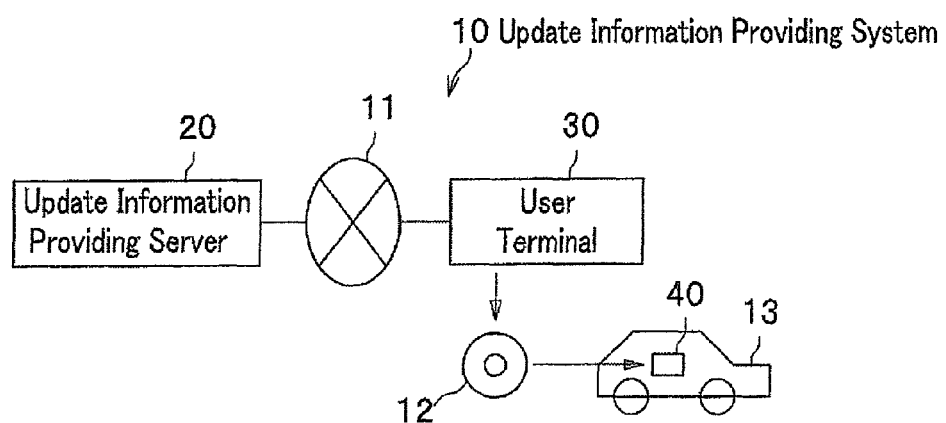
FIG. 1 is a system configuration showing an example of an update information providing system in a first embodiment.

FIG. 1 is a system configuration showing an example of an update information providing system 10 in the first embodiment. The update information providing system 10 of the embodiment comprises an update information providing server 20, a user terminal 30, and a car navigation system 40. The update information providing server 20 and the user terminal 30 are connected to a communication line 11 and communicate with each other through the line 11.

The update information providing server 20 manages newest map data composed of plural kinds of data and provides information relating to the newest map data according to a request from the user terminal 30 through the communication line 11.

The user terminal 30 acquires information relating to the newest map data from the update information providing server 20 according to an instruction from a user, and stores the acquired information relating to the newest map data in a recording medium 12 such as a CD-ROM (Compact Disc-Read Only Memory), a DVD-ROM (Digital Versatile Disc-Read Only Memory), and a semi-conductor memory 12.

The navigation system 40 is mounted on a vehicle 13 and the like, refers map data held in the system 40, and achieves functions such as a route calculate, a map drawing, a route guidance, and an address search. The navigation system 40 updates the map data held therein to a newest state, using data in the recording medium 12, when the medium 12 where information relating to the newest map data is stored is attached.

Figure 2:
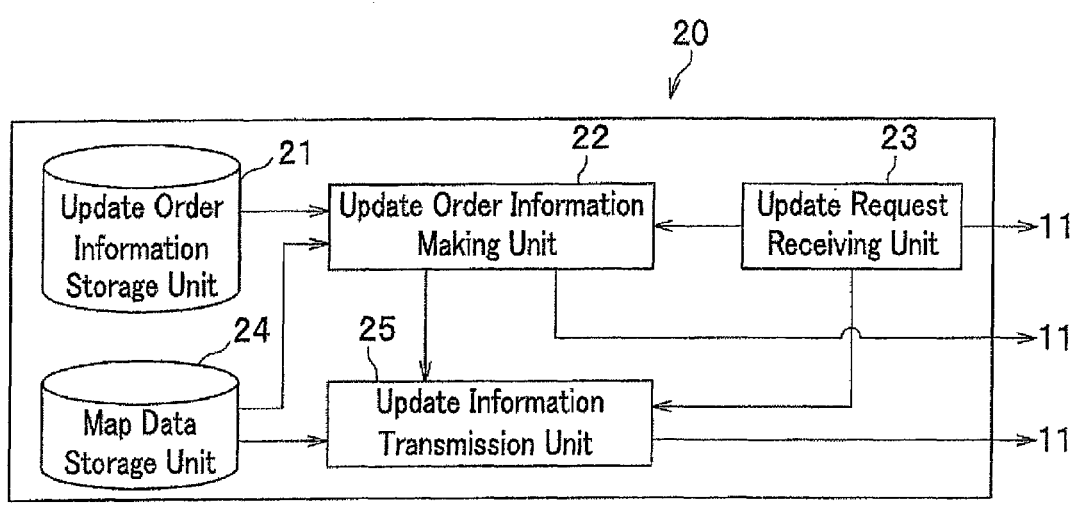
FIG. 2 is a block diagram showing an example of a function configuration of an update information providing server in the first embodiment.

FIG. 2 is a block diagram showing an example of a function configuration of the update information providing server 20 in the first embodiment. The update information providing server 20 comprises an update order information storage unit 21, an update order information making unit 22, an update request receiving unit 23, a map data storage unit 24, and an update information transmission unit 25.

Figure 3:
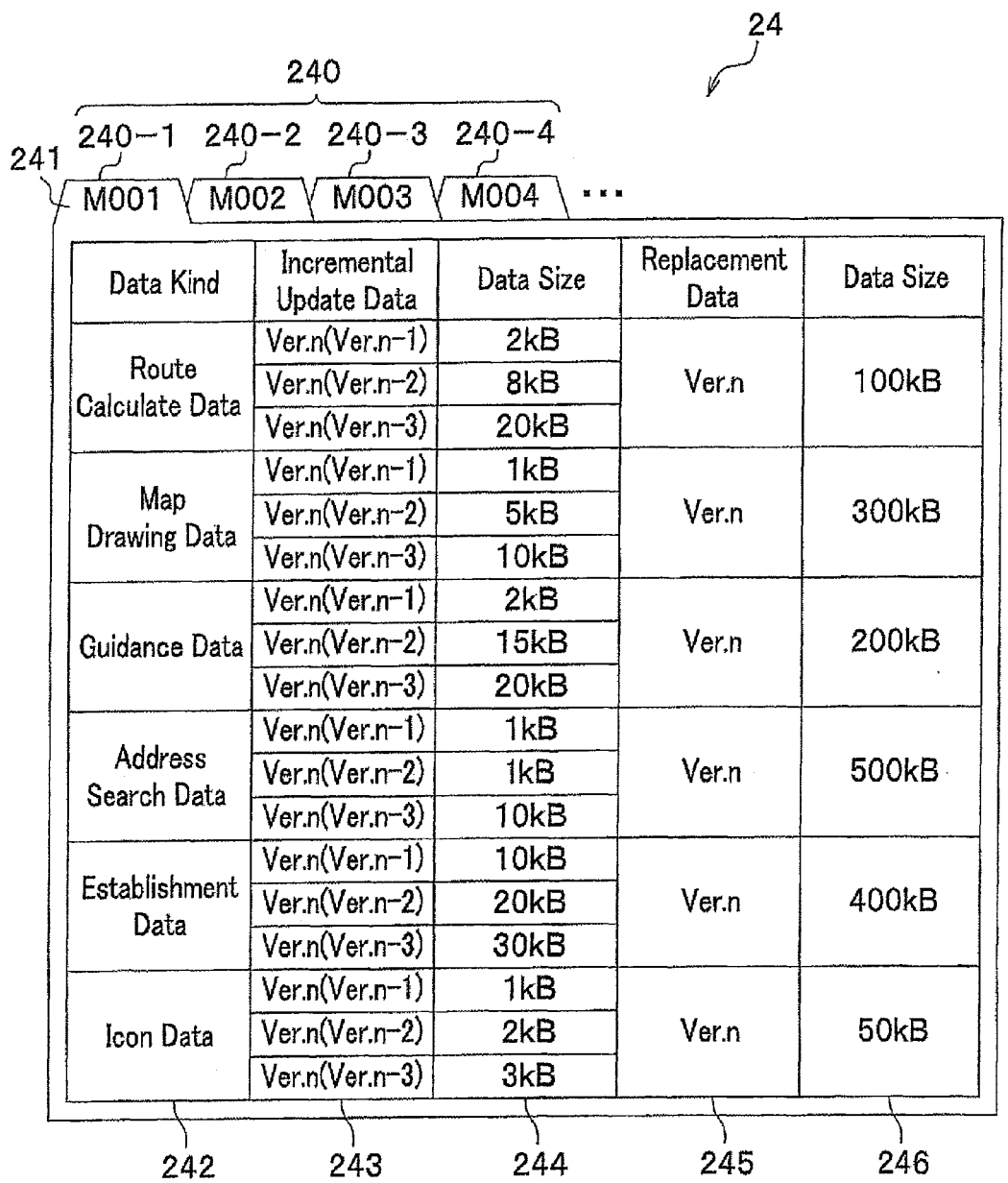
FIG. 3 is a drawing showing a data structure stored in a map data storage unit.

In the map data storage unit 24, for example, as shown in FIG. 3, plural kinds of data included in map data are stored as mesh data 240 for every predetermined area in a map. A mesh ID (Identification) 241 for identifying each mesh is associated with each of mesh data 240-1, 240-2, 240-3, 240-4 . . . .

Furthermore, with respect to data associated with a data kind 242, for every data kind 242 included in map data, in each of the mesh data 240-1, 240-2, 240-3, 240-4 . . . are stored incremental update data 243 for indicating a difference from a past version; a data size 244 of the incremental update data 243; replacement data 245 that can be updated to newest data by being replaced; and a data size 246 of the replacement data 245.

Route calculate data is information (coordinates of a start point and an end point, cost, a road kind, and the like) relating to a link indicating a road, and is the map data mainly used in a route calculate function of the navigation system 40. Map drawing data is an image of a terrain, a geographic name, and the like, and is the map data mainly used in a map drawing function of the navigation system 40. Guidance data is a detailed image of an intersection, a guidance sound, and the like, and is the map data mainly used in a route guidance function of the navigation system 40.

Address search data is address data and is the map data mainly used in an address search function of the navigation system 40. Establishment data is information such as an establishment, a spot, and the like, and is the map data mainly used in a POI (Point Of Interest) search function of the navigation system 40. In addition, although the data of each data kind is different mainly in a function referred, a part of the data is referred by a plurality of functions in some cases.

In the replacement data 245 are stored a replacement data main body together with "Ver. n" which is a version name of newest data. In the incremental update data 243 are stored an incremental-update-data main body together with information for indicating a past version to be objected for every past version to be objected. With respect to an example shown in FIG. 3, it is shown that "Ver. n (Ver. n−1)" stored in the incremental update data 243 is a difference between newest map data "Ver. n" and old map data "Ver. n−1," and the version name of map data in a case of the difference being applied is "Ver. n." In the data size 244 is stored the data size of an incremental-update-data main body for every past version to be objected.

Figures 4, 5:
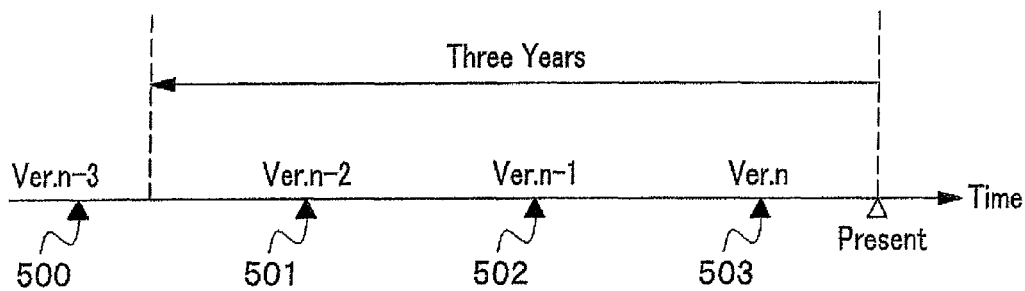
FIG. 4 is a conceptual drawing illustrating a relationship between versions of incremental update data.
FIG. 5 is a drawing showing an example of a data structure stored in an update order information storage unit.

According to the embodiment, as shown in FIG. 4, a difference between a present version and a version released for a past predetermined period (for example, three years) is stored as incremental update data. In an example shown in FIG. 4, the newest version of present map data is "Ver. n" made at a time 503. Because the newest version of map data before three years from the present time is "Ver. n−3," in the update order information storage unit 21 are stored three kinds: "Ver. n (Ver. n−1)" that is incremental update data between "Ver. n" and "Ver. n−1;" "Ver. n (Ver. n−2)" that is incremental update data between "Ver. n" and "Ver. n−2;" and "Ver. n (Ver. n−3)" that is incremental update data between "Ver. n" and "Ver. n−3."

In the update order information storage unit 21, for example, as shown in FIG. 5, for every data kind 210 are stored in advance an update order 211 in a case of route calculate data being preferentially updated; an update order 212 in a case of map drawing data being preferentially updated; an update order 213 in a case of address search data being preferentially updated; and an update order 214 in a case of establishment data being preferentially updated.

In each of the update orders 211-214 an order associated with a data kind of data to be preferentially updated is the smallest value. Furthermore, an order of a smaller value is associated in order with the data kind of data used in a process in a closer relationship with that where the data of the data kind to be preferentially updated is used.

The update request receiving unit 23 receives a map data update request from the user terminal 30 through the communication line 11, wherein the update request includes priority information for indicating a data kind to be preferentially updated; area information for indicating the mesh ID 241 in a map of an update object; and information for indicating a capacity of the recording medium 12 where update data is stored. Then the update request receiving unit 23 sends the priority information, the area information, and the information for indicating the capacity of the recording medium 12 included in the map data update request to the update order information making unit 22, and sends the area information to the update information transmission unit 25. Here, the map data update request may include a user ID for authenticating a user other than the capacity of the recording medium 12, the priority information, and the area information. Furthermore, the map data update request is composed, for example, of an http protocol, and may be composed of http://serverURL/size=650000000&mode=routecalc&area=tokyo_pref&userID=62738148, assuming parameters representing the capacity of the recording medium 12, the priority information, the area information, and the user ID to be "size," "mode," "area," and "userID," respectively.

The update order information making unit 22 refers the priority information received from the update request receiving unit 23, and acquires an update order from the update order information storage unit 21 when the unit 22 preferentially updates a data kind indicated by the priority information. In the embodiment it is assumed that route calculate data is notified from the user terminal 30 as the priority information. According to this case, in an example of FIG. 5 the update order information making unit 22 acquires the update order 211 from the update order information storage unit 21.

Next, the update order information making unit 22 extracts incremental update data associated with the mesh ID 241 from the map data storage unit 24 for every data kind, based on the mesh ID 241 indicated by the area information received from the update request receiving unit 23. In addition, in the embodiment the update information providing server 20 sends the incremental update data between all versions released for a past predetermined period, makes the navigation system 40 apply the incremental update data of requested versions, and thereby, simplifies a version management in the system 40.

The update order information making unit 22 calculates a sum of a data size for every data kind with respect to the extracted incremental update data. FIG. 6 is a conceptual drawing indicating a data size of update data for every data kind, wherein the data size is calculated by the update order information making unit 22. A flag 512 is a flag: wherein when update data extracted from the map data storage unit 24 is incremental update data, the flag 512 is "0;" wherein when the update data extracted from the map data storage unit 24 is replacement data, the flag 512 is "1." In a state shown in FIG. 6, because all the extracted update data is the incremental update data, all of the flag 512 are "0."

Next, the update order information making unit 22 further sums up the sum of the data size for the every data kind, calculates the data size of update data, and determines whether or not the data size of the calculated update data is less than a capacity of the recording medium 12 received from the update request receiving unit 23. In the embodiment a CD-ROM is assumed as the recording medium 12 for recording the update data, and a capacity of 640 MB is assumed to be notified from the user terminal 30 as information for indicating the capacity of the recording medium 12.

In an example shown in FIG. 6, because the data size of update data is 130 MB and less than 640 MB indicating the capacity of the recording medium 12 received from the update request receiving unit 23, the update order information making unit 22 acquires replacement data associated with the incremental update data of a data kind to be firstly updated in an update order acquired from the update order information storage unit 21. Then the update order information making unit 22 recalculates, as shown in FIG. 7, the data size of the update data when a data kind to be firstly updated (route calculate data) is replaced with the replacement data.

In an example shown in FIG. 7, because the data size of update data is 300 MB and less than 640 MB, the update order information making unit 22 acquires replacement data associated with the incremental update data of a data kind to be secondly updated in the update order acquired from the update order information storage unit 21. Then the update order information making unit 22 recalculates, as shown in FIG. 8, the data size of the update data when a data kind to be secondly updated (guidance data) is replaced with the replacement data.

In an example shown in FIG. 8, because the data size of update data is 370 MB and less than 640 MB, the update order information making unit 22 acquires replacement data associated with the incremental update data of a data kind to be thirdly updated in the update order acquired from the update order information storage unit 21. Then the update order information making unit 22 recalculates, as shown in FIG. 9, the data size of the update data when a data kind to be thirdly updated (map drawing data) is replaced with the replacement data.

Figures 10, 11:
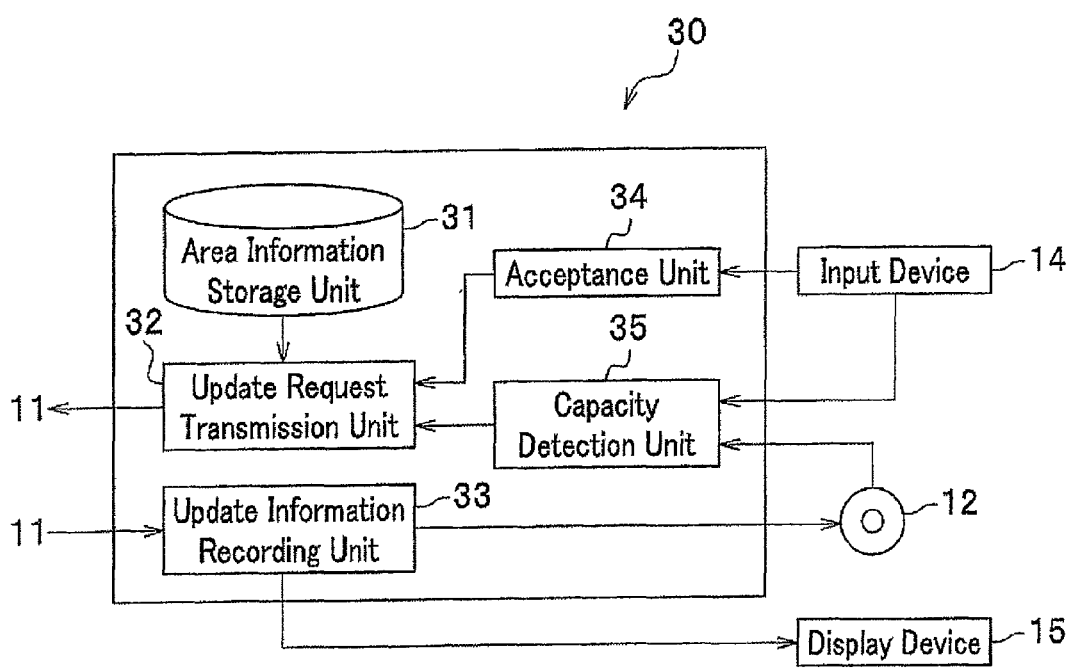
FIG. 10 is a drawing showing an example of a data structure of update order information.
FIG. 11 is a block diagram showing an example of a function configuration of a user terminal.

In an example shown in FIG. 9, because the data size of update data is 750 MB and not less than 640 MB, the update order information making unit 22 fixes the combination of the incremental update data and the replacement data shown in FIG. 8 as final update data. Then the update order information making unit 22 arranges, as shown in FIG. 10, a data kind 51 in the same order as an update order acquired from the update order information storage unit 21; generates update order information 50 that stores a flag 52 indicating that associated data is the incremental update data or the replacement data for every data kind 51; and sends the generated update order information to the update information transmission unit 25.

In addition, when all data of an update object is made the incremental update data and the sum of a data size thereof is not less than the capacity of the recording medium 12 received the update request receiving unit 23, the update order information making unit 22 transmits an error notification to the user terminal 30 through the communication line 11, wherein the notification indicates that it is requested to narrow the area of the update object or to use the recording medium 12 with a larger remaining capacity.

When the update information transmission unit 25 receives the update order information 50 from the update order information making unit 22, the transmission unit 25 refers the flag 52 for every data kind 51; with respect to a data kind where the flag 52 indicating "1" is associated, the transmission unit 25 extracts from the map data storage unit 24 the replacement data associated with the area information received from the update request receiving unit 23; and with respect to a data kind where the flag 52 indicating "0" is associated, the transmission unit 25 extracts from the storage unit 24 the incremental update data associated with the area information received from the receiving unit 23.

Then the update information transmission unit 25 makes update information including the extracted replacement data and incremental update data, and the update order information 50 received from the update order information making unit 22; and transmits the made update information to the user terminal 30 through the communication line 11. In addition, the mesh ID 241 is associated with each piece of the replacement data and the incremental update data in the update information, and if any piece of the replacement data and the incremental update data is referred, it proves which mesh the piece belongs to.

FIG. 11 is a block diagram showing an example of a function configuration of the user terminal 30. The terminal 30 comprises an area information storage unit 31, an update request transmission unit 32, an update information recording unit 33, an acceptance unit 34, and a capacity detection unit 35.

Figures 12, 13:
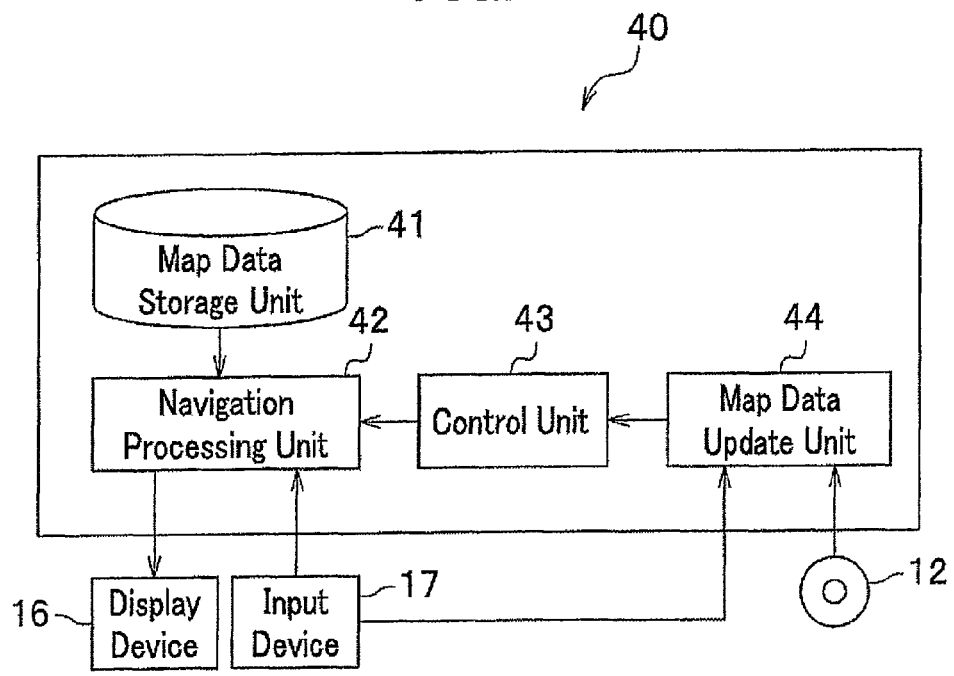
FIG. 12 is a drawing showing an example of a data structure stored in an area information storage unit.
FIG. 13 is a block diagram showing an example of a function configuration of a car navigation system in the first embodiment.

In the area information storage unit 31 is stored, for example as shown in FIG. 12, a sub-area name 311 for identifying a sub-area included in an area associated with an area name 310 for every area name 310 which identifies an area on a map. A mesh ID 312 of a mesh is associated with each sub-area name 311, wherein the mesh is included in an area associated with the sub-area name 311.

For example, in a case of Japan, any name of a prefectural and city government is stored in the area name 310; any name of a city, a town, and a village is stored in the sub-area name 311. Furthermore, in a case of the U.S., a state name is stored in the area name 310; a county name is stored in the sub-area name 311. Furthermore, in a case of Europe, a country name is stored in the area name 310; a region name according to the administrative district of each country is stored in the sub-area name 311.

The acceptance unit 34 accepts the area information for indicating the area of an update object of map data and the priority information for indicating a data kind to be preferentially updated from a user through an input device 14 such as a keyboard; and sends the received area information and priority information to the update request transmission unit 32.

The capacity detection unit 35 detects the remaining capacity of a recording medium 12 attached to the user terminal 30, and notifies the update request transmission unit 32 of the detected remaining capacity. In addition, the remaining capacity of the recording medium 12 may be designated with a numeric by a user through the acceptance unit 34.

When the update request transmission unit 32 receives the area information and the priority information from the acceptance unit 34 and if the area information is not the mesh ID 312, the transmission unit 32 refers the area information storage unit 31 and converts the area information to that indicating the mesh ID 312. Then the update request transmission unit 32 makes a map data update request including the area information for indicating the mesh ID 312, the priority information, and information for indicating the remaining capacity of the recording medium 12 notified from the capacity detection unit 35; and transmits the made map data update request to the update information providing server 20 through the communication line 11.

When the update information recording unit 33 receives update information from the update information providing server 20 through the communication line 11, the recording unit 33 records the received update information in the recording medium 12. Furthermore, when the update information recording unit 33 receives an error notification from the update information providing server 20 through the communication line 11, the recording unit 33 displays the content of the notification in a display device 15.

FIG. 13 is a block diagram showing an example of a function configuration of the navigation system 40 in the first embodiment. The navigation system 40 comprises a map data storage unit 41, a navigation processing unit 42, a control unit 43, and a map data update unit 44.

Figure 14:
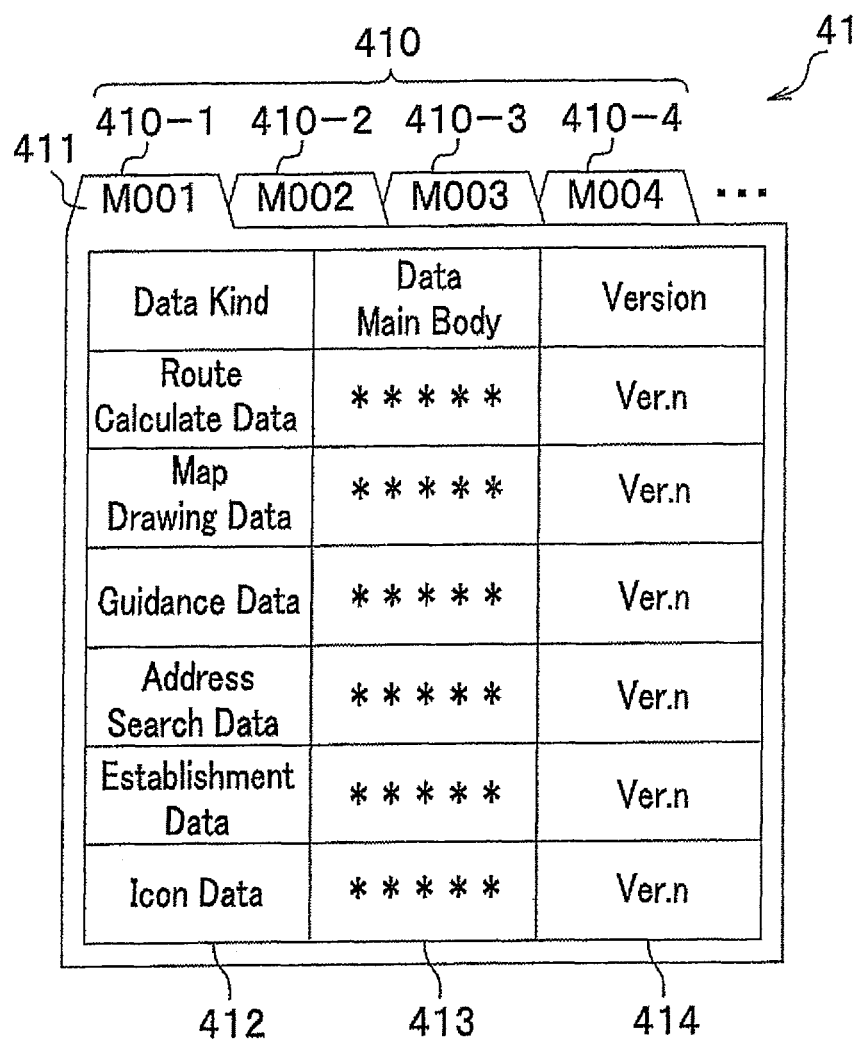
FIG. 14 is a drawing showing an example of a data structure stored in a map data storage unit.

In the map data storage unit 41, for example as shown in FIG. 14, plural kinds of data included in map data are stored as mesh data 410 on a map for every predetermined area. With each of mesh data 410-1, 410-2, 410-3, 410-4 . . . is associated a mesh ID 411 for identifying each mesh. Furthermore, in each of the mesh data 410-1, 410-2, 410-3, 410-4 . . . are stored a data main body 413 associated with the data kind 412 for indicating a data kind of data, and a version 414 of the main body 413 for every data kind 412 included in the map data.

The navigation processing unit 42 performs a process of using map data associated with the data kind 412 in the map data stored in the map data storage unit 41. For example, when the navigation processing unit 42 performs a route calculate function, it mainly uses route calculate data. Furthermore, when the navigation processing unit 42 performs a map drawing function, it mainly uses map drawing data. Furthermore, when the navigation processing unit 42 performs a route guidance function, it mainly uses guidance data. Furthermore, when the navigation processing unit 42 performs an address search function, it mainly uses address search data.

Furthermore, when the navigation processing unit 42 is instructed to prohibit an activation from the control unit 43, the processing unit 42 stops all functions of using map data in the map data storage unit 41. Furthermore, when the navigation processing unit 42 is instructed to permit an activation of designating the data kind 412 from the control unit 43, the processing unit 42 permits to activate a function of using map data associated with the data kind 412.

When the recording medium 12 where update information is recorded is attached to the user terminal 30, and the map data update unit 44 is instructed to update map data through an input device 17 such as a touch panel, the update unit 44 notifies the control unit 43 of update start of the map data. Then the map data update unit 44 updates the map data associated with each data kind 412 in the map data storage unit 41 according to an order defined in the update order information 50 (see FIG. 10) in the update information.

To be more precise, with respect to the update order information 50, when the data kind 412 is associated with the flag 52 indicating "1," the map data update unit 44 reads from the recording medium 12 replacement data associated with the data kind 412 for every mesh ID 411 of a mesh of an update object, and overwrites and updates corresponding map data in the map data storage unit 41 by the read replacement data.

Furthermore, with respect to the update order information 50, when the data kind 412 is associated with the flag 52 indicating "0," the map data update unit 44 reads the version of map data associated with the data kind 412 and stored in the map data storage unit 41 for every mesh ID 411 of a mesh of an update object. Then the map data update unit 44 specifies incremental update data applicable to the read version for every mesh ID 411 of the mesh of the update object.

For example, with respect to a combination of the data kind 412 associated with the flag 52 indicating "0" and the mesh ID 411 of a mesh of an update object, when map data of "Ver. n−2" is stored in the map data storage unit 41, and the incremental update data of "Ver. n (Ver. n−1)," "Ver. n (Ver. n−2)," and "Ver. n (Ver. n−3)" in the recording medium 12, the map data update unit 44 specifies incremental update data whose version name is "Ver. n (Ver. n−2)," as applicable incremental update data.

Then with respect to the combination of the data kind 412 associated with the flag 52 indicating "0" and the mesh ID 411 of the mesh of the update object, the map data update unit 44 makes the replacement data from the specified incremental update data and the map data associated therewith in the map data storage unit 41. Then the map data update unit 44 overwrites and updates corresponding map data in the map data storage unit 41 by the made replacement data.

The map data update unit 44 updates map data for every data kind 412 with respect to the mesh of the update order according to the order of update order information 50; and notifies the control unit 43 of the data kind 412 whose updating is completed every time when updating all map data associated with the data kind 412 is completed.

When the control unit 43 is notified of update start of map data, it instructs the navigation processing unit 42 to stop a function of using map data in the map data storage unit 41. Then when the control unit 43 is notified of the data kind 412 whose updating is completed from the map data update unit 44, the control unit 43 instructs the navigation processing unit 42 to permit to activate a function of using map data associated with the data kind 412.

Here, with respect to the update order information 50, the data kind 412 to be firstly updated is the kind 412 designated by a user of the user terminal 30, the map data update unit 44 updates map data according to an order of the update order information 50. Furthermore, because the control unit 43 optionally permits to activate a function of using data of the data kind 412 whose updating is completed, the update information providing system 10 can speedily activate a function of the navigation system 40 wanted to be used by the user in a state of being able to refer newest map data by designating the data kind 412 of map data used in a function which he/she wants to use through the user terminal 30.

Furthermore, because the update information providing system 10 updates the data of the data kind 412 used in a function wanted to be used by a user in a range of the capacity of the recording medium 12 used for updating the data, it is possible to update map data more speedily by using replacement data than by using incremental update data, wherein the map data is used for the function of the navigation system 40 wanted to be used by him/her. Furthermore, if the capacity of the recording medium 12 has a room, because the update information providing system 10 further updates the data of the data kind 412 (another data kind) by using replacement data, it is possible to reduce a total time taken in updating the map data of the navigation system 40.

Figure 15:
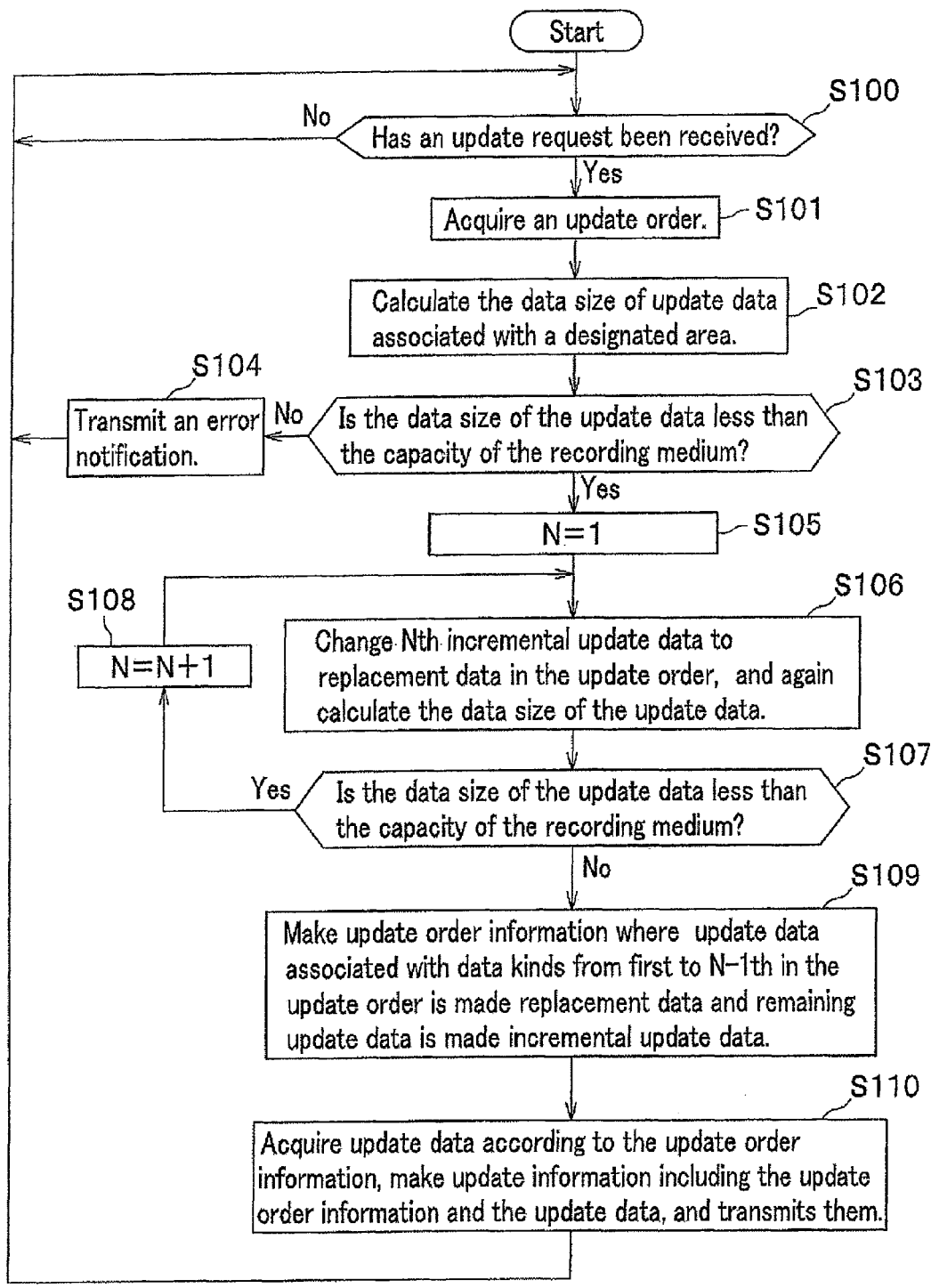
FIG. 15 is a flowchart showing an example of operations of the update information providing server in the first embodiment.

FIG. 15 is a flowchart showing an example of operations of the update information providing server 20 in the first embodiment. For example, at a predetermined time when power is turned on, the update information providing server 20 starts the operations shown in the flowchart.

Firstly, the update request receiving unit 23 determines whether or not to have received a map data update request through the communication line 11 (S100). When update request receiving unit 23 does not receive the map data update request (No in the S100), it repeats the step S100 until it receives the request. When the update request receiving unit 23 receives the map data update request (Yes in the S100), it sends priority information included in the map data update request, area information, and information for indicating the capacity of the recording medium 12, and sends the area information to the update information transmission unit 25.

Next, the update order information making unit 22 refers the priority information received from the update request receiving unit 23, and acquires an update order from the update order information storage unit 21 in a case of preferentially updating a data kind indicated by the priority information (S101). Then the update order information making unit 22 acquires incremental update data associated with a mesh ID for every data kind from the map data storage unit 24, based on the mesh ID indicated by the area information from the update request receiving unit 23. Then the update order information making unit 22 calculates the sum of a data size of incremental update data for the every data kind with respect to the acquired incremental update data, further sums up the sum, and calculates the data size of update data (S102).

Next, the update order information making unit 22 determines whether or not the data size of the update data is less than the capacity of the recording medium 12 received from the update request receiving unit 23 (S103). When the data size of the update data is not less than the capacity of the recording medium 12 received from the update request receiving unit 23 (No in the S103), the update order information making unit 22 narrows the area of an update object or transmits an error notification of indicating that it is requested to use the recording medium 12 whose remaining capacity is large (S104); the update request receiving unit 23 again performs the process indicated in the step S100.

When the data size of the update data is less than the capacity of the recording medium 12 received from the update request receiving unit 23 (Yes in the S103), the update order information making unit 22 initializes a variable N to "1" (S105), changes Nth incremental update data to replacement data with respect to the update order acquired in the step S101, and again calculates the data size of the update data (S106).

Next, the update order information making unit 22 determines whether or not the data size of the update data again calculated is less than the capacity of the recording medium 12 received from the update request receiving unit 23 (S107). When the data size of the update data again calculated is less than the capacity of the recording medium 12 received from the update request receiving unit 23 (Yes in the S107), the update order information making unit 22 increases the variable N by "1" (S108), and again performs the process indicated in the step S106.

When the data size of the update data again calculated is not less than the capacity of the recording medium 12 received from the update request receiving unit 23 (No in the S107), the update order information making unit 22 makes update order information where the update data of data kinds from first to N-1th is made replacement data in an update order, and that of a data kind other than the above is made incremental update data (S109).

Next, the update information transmission unit 25 refers a flag in the update order information, and with respect to a data kind where a flag indicating "1" is associated, extracts from the map data storage unit 24 replacement data associated with the area information received from the update request receiving unit 23; whereas, with respect to a data kind where a flag indicating "0" is associated, the transmission unit 25 extracts from the map data storage unit 24 incremental update data associated with the area information received from the update request receiving unit 23.

Then the update information transmission unit 25 makes the extracted replacement data and incremental update data to be update data, and makes update information including the update data and the update order information. Then the update information transmission unit 25 transmits the made update information to the user terminal 30 through the communication line 11 (S110), and the update request receiving unit 23 again performs the process indicated in the step S100.

Figure 16:
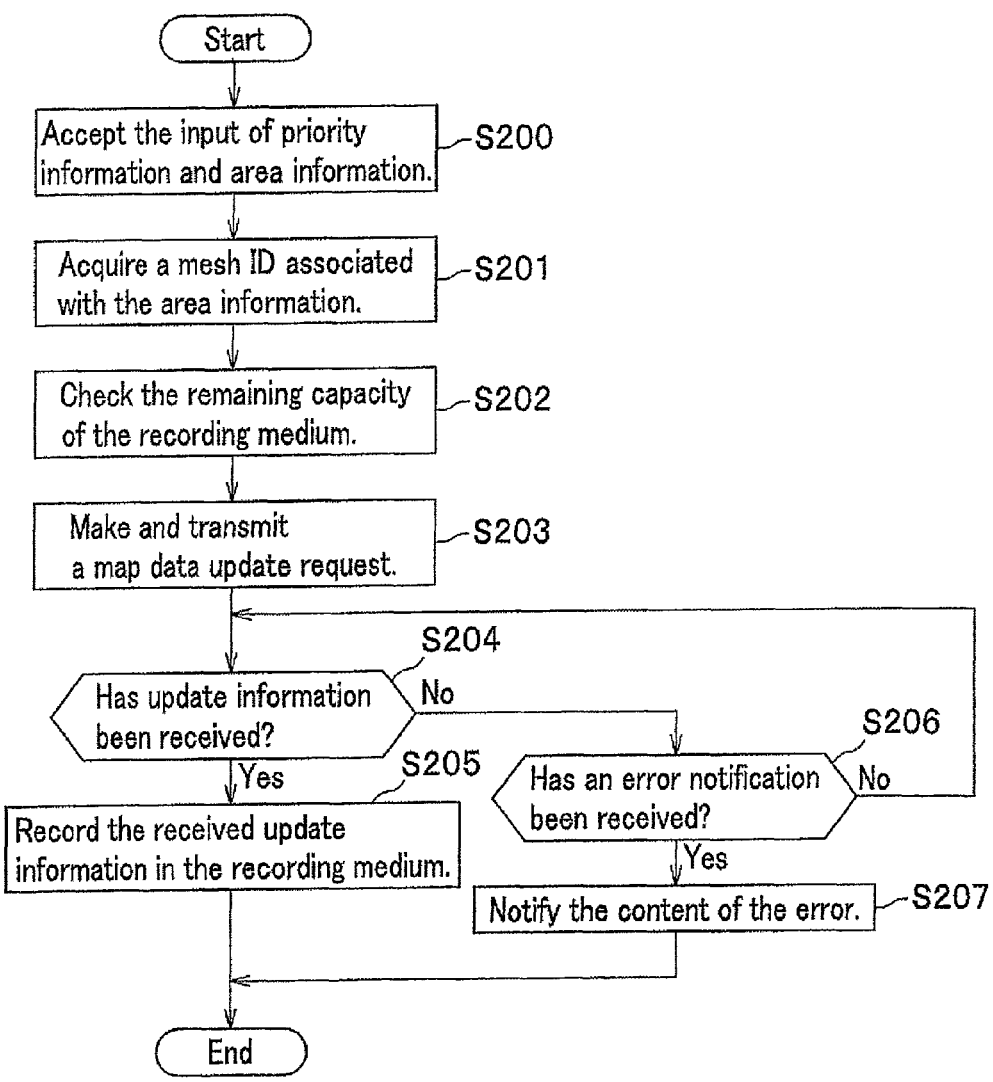
FIG. 16 is a flowchart showing an example of operations of the user terminal in the first embodiment.

FIG. 16 is a flowchart showing an example of operations of the user terminal 30 in the first embodiment. When the recording medium 12 is attached to the user terminal 30 and it is instructed to make update information from a user, the terminal 30 starts the operations shown in the flowchart.

Firstly, the acceptance unit 34 accepts area information and priority information from a user, and sends the received area information and priority information to the update request transmission unit 32 (S200). Then when the area information is not a mesh ID, the update request transmission unit 32 refers the area information storage unit 31 and converts the area information to that indicating the mesh ID (S201).

Next, the capacity detection unit 35 detects the remaining capacity of the recording medium 12 attached to the user terminal 30, and notifies the update request transmission unit 32 of information for indicating the detected remaining capacity (S202). Then the update request transmission unit 32 makes a map data update request including the area information for indicating the mesh ID, the priority information, and information for indicating the remaining capacity of the recording medium 12 notified from the capacity detection unit 35, and transmits the made map data update request to the update information providing server 20 through the communication line 11 (S203).

Next, the update information recording unit 33 determines whether or not to have received update information from the update information providing server 20 through the communication line 11 (S204). When the update information recording unit 33 receives the update information (Yes in the S204), it records the received update information in the recording medium 12 (S205), and the user terminal 30 completes the operations shown in the flowchart.

When the update information recording unit 33 does not receive the update information (No in the S204), it determines whether or not to have received an error notification (S206). When the update information recording unit 33 does not receive the error notification (No in the S206), it again performs the process indicated in the step S204. When the update information recording unit 33 receives the error notification (Yes in the S206), it displays the content of the error notification in the display device 15 (S207), and the user terminal 30 completes the operations shown in the flowchart.

Figure 17:
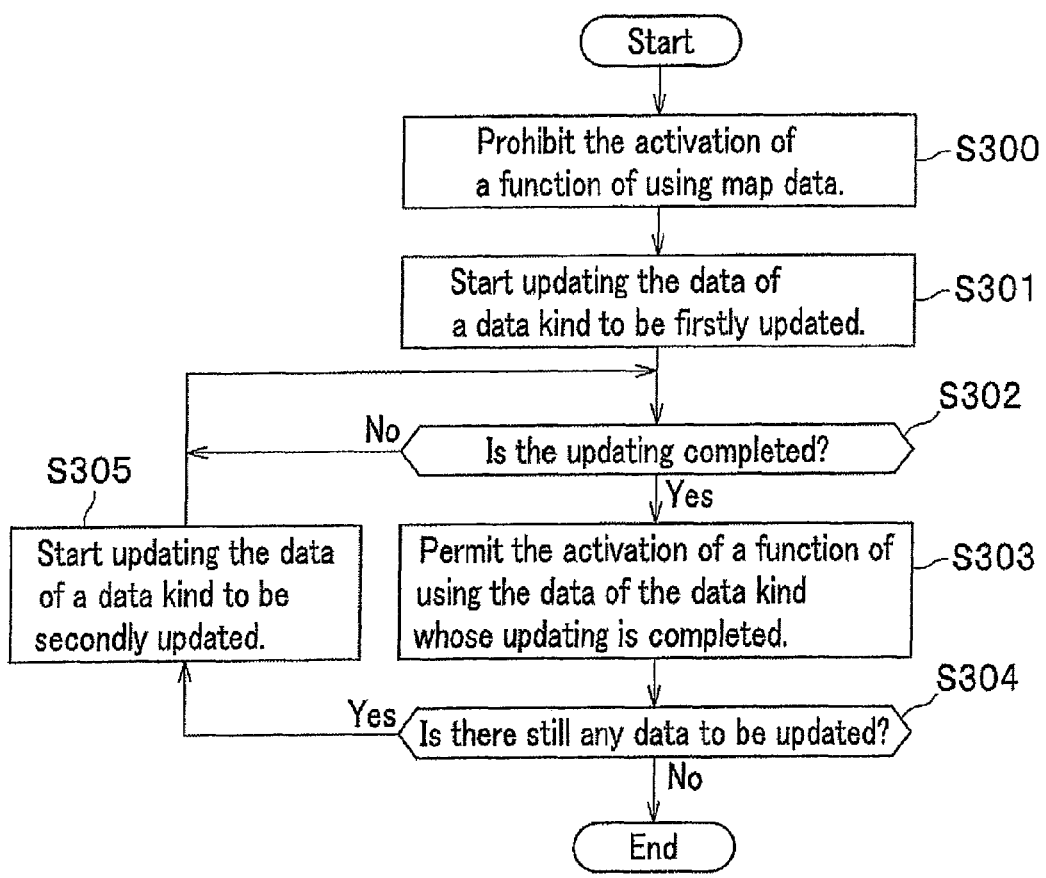
FIG. 17 is a flowchart showing an example of operations of the navigation system in the first embodiment.

FIG. 17 is a flowchart showing an example of operations of the navigation system 40 in the first embodiment. When the recording medium 12 where update information is recorded is attached to the user terminal 30, and the navigation system 40 is instructed to update map data through the input device 17, the system 40 starts the operations shown in the flowchart.

Firstly, the map data update unit 44 notifies the control unit 43 of update start of map data. The control unit 43 instructs the navigation processing unit 42 to prohibit the activation of a function of using data in the map data storage unit 41 (S300). Then the map data update unit 44 specifies the map data of a data kind to be firstly updated in the map data storage unit 41 according to update order information in the recording medium 12, and starts a process of updating the specified map data by update data in the recording medium 12 (S301).

Then when the map data update unit 44 completes updating the map data associated with the data kind (Yes in S302), the update unit 44 notifies the control unit 43 of the data kind whose updating is completed, and the control unit 43 instructs the navigation processing unit 42 to permit the activation of a function of using the map data associated with the data kind (S303). Then the map data update unit 44 refers the update order information in the recording medium 12, and determines whether or not there remains any data kind to be updated (S304).

When there remains any data kind to be updated (Yes in the S304), the map data update unit 44 specifies the map data of a data kind to be secondly updated in the map data storage unit 41, starts a process of updating the specified map data by update data in the recording medium 12 (S305), and again performs the process indicated in the step S302. When there remains no data kind to be updated (No in the S304), the navigation system 40 completes the operations shown in the flowchart.

Thus the first embodiment of the present invention has been described.

As apparent from the above descriptions, because the update information providing system 10 can update map data in the navigation system 40 in order from data of a data kind designated by a user, the system 10 can speedily activate a function wanted to be used by him/her in a state of being able to refer newest map data.

Next will be described a second embodiment of the present invention.

Figure 18:
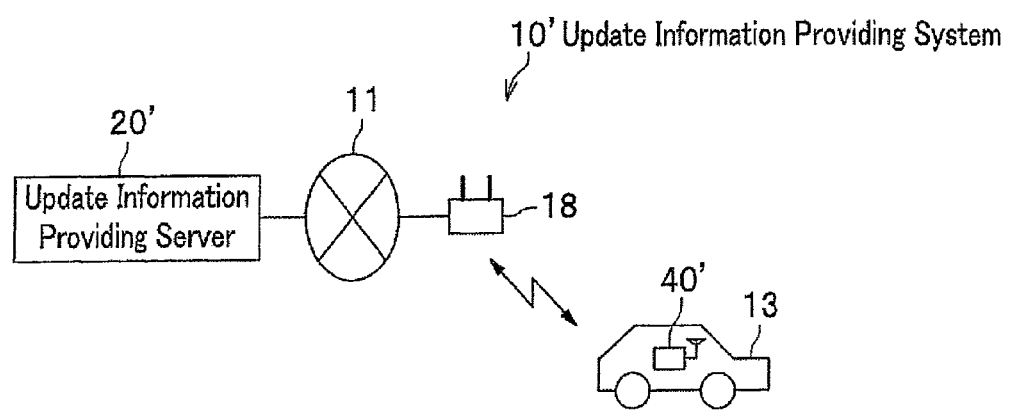
FIG. 18 is a system configuration showing an example of an update information providing system in a second embodiment.

FIG. 18 is a system configuration showing an example of an update information providing system 10' in the second embodiment. The update information providing system 10' comprises an update information providing server 20' and a car navigation system 40'. The update information providing server 20' is connected to the communication line 11. The navigation system 40' communicates with a nearest base station 18 by a radio communication, and thereby, communicates with the update information providing server 20' through the station 18.

The update information providing server 20' manages newest map data composed of plural kinds of data, and provides information relating to the map data to the navigation system 40' through communication line 11 according to a request from the system 40'.

The navigation system 40' is mounted on the vehicle 13 and the like, refers map data held in the system 40', and achieves functions such as a route calculate, a map drawing, and an address search. The navigation system 40' acquires, according to the instruction of a user, information relating the newest map data from the update information providing server 20', and updates the map data held in the system 40' by the acquired newest map data.

Figure 19:
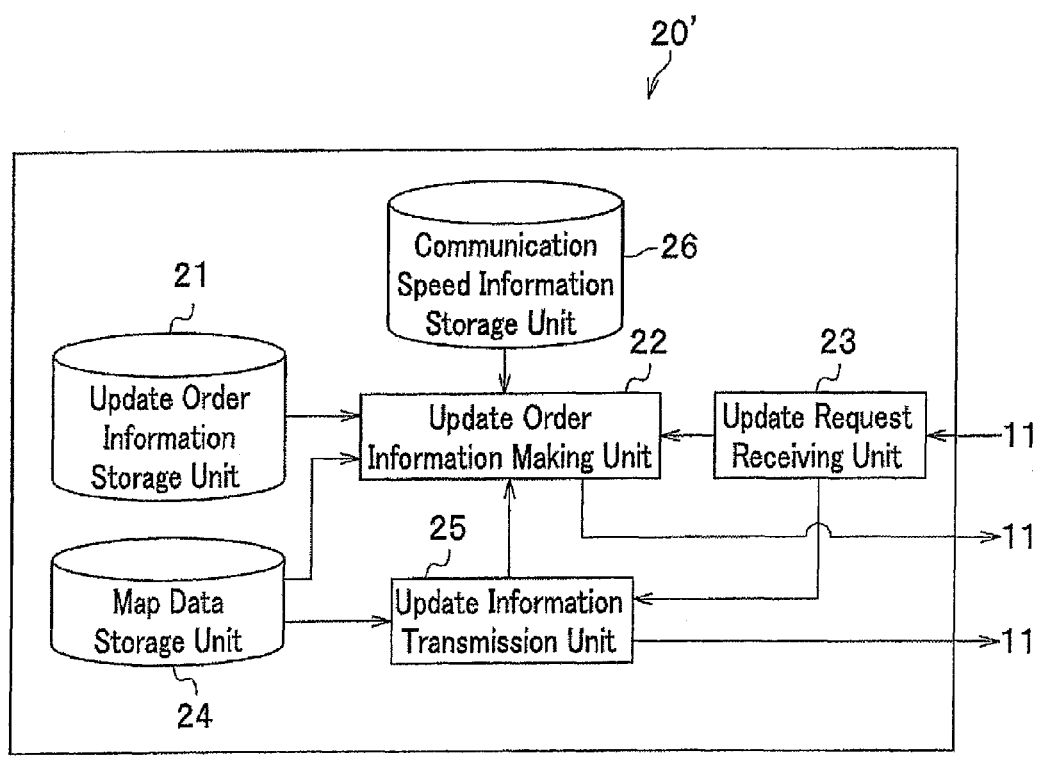
FIG. 19 is a block diagram showing an example of a function configuration of an update information providing server in the second embodiment.

FIG. 19 is a block diagram showing an example of a function configuration of the update information providing server 20' in the second embodiment. The update information providing server 20' comprises the update order information storage unit 21, the update order information making unit 22, the update request receiving unit 23, the map data storage unit 24, the update information transmission unit 25, and a communication speed information storage unit 26. In addition, excluding points described below, because a configuration in FIG. 19 with a same reference numeral as in FIG. 2 has the same or similar function as in FIG. 2, its description will be omitted.

Figures 20, 21:
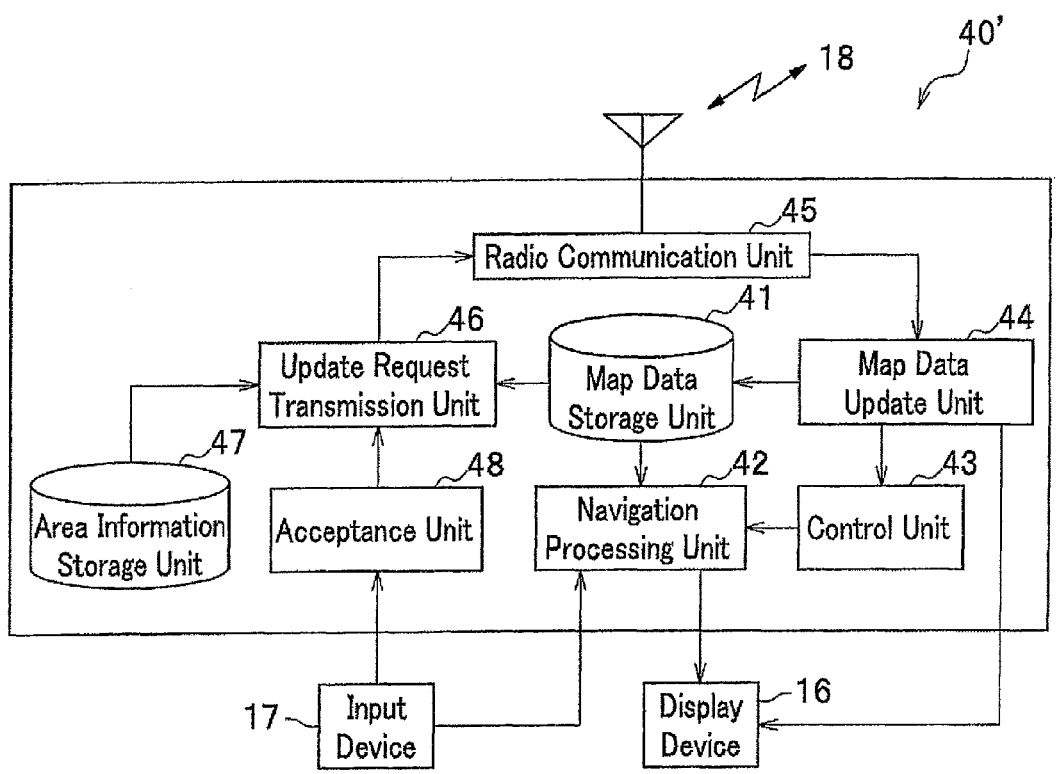
FIG. 20 is a drawing showing an example of a data structure stored in a communication speed information storage unit.
FIG. 21 is a block diagram showing an example of a function configuration of a car navigation system in the second embodiment.

In the communication speed information storage unit 26 is stored, for example as shown in FIG. 20, an average communication speed 261 associated with a line kind 260 for every line kind 260 identifying such a communication carrier and a service article in the communication line 11.

The update request receiving unit 23 receives a map data update request including priority information, area information, the line kind 260, and map data version information through the communication line 11 from the user terminal 30. Then the update request receiving unit 23 sends the priority information, the area information, the line kind 260, and the version included in the map data update request to the update order information making unit 22, and sends the area information to the update information transmission unit 25.

The update order information making unit 22 acquires an update order associated with the priority information, based on the priority information received from the update request receiving unit 23. Then the update order information making unit 22 acquires incremental update data associated with a mesh ID for every data kind from the map data storage unit 24, based on the mesh ID indicated in the area information received from the update request receiving unit 23.

Then the update order information making unit 22 extracts incremental update data from a version indicated in the version information received from the update request receiving unit 23 out of the acquired incremental update data, and calculates the sum of a data size for every data kind with respect to the extracted incremental update data. Then the update order information making unit 22 further sums up the sum of the data size for the every data kind, and calculates the data size of update data.

Next the update order information making unit 22 refers the communication speed information storage unit 26, based on a line kind received from the update request receiving unit 23; extracts an average communication speed associated with the line kind; and calculates a transmission data size which is a data size transmittable for a predefined time (for example, one minute) according to the line kind.

Then the update order information making unit 22 determines whether or not the data size of the update data is less than the transmission data size. When the data size of the update data is not less than the transmission data size, the update order information making unit 22 transmits an error notification, which indicates that it is requested to narrow an area of an update object, to the navigation system 40' through the communication line 11.

When the data size of the update data is less than the transmission data size, the update order information making unit 22 acquires replacement data associated with incremental update data of a data kind to be firstly updated from the update order information storage unit 21, and again calculates the data size of the update data. Then when the data size of the update data again calculated is not less than the transmission data size, the update order information making unit 22 makes update order information whose flag associated with all data kind is "0," and sends the information to the update information transmission unit 25.

When the data size of the update data again calculated is less than the transmission data size, the update order information making unit 22 changes the incremental update data to replacement data in order of a data kind defined as an update order in a range where the data size of the update data does not exceed the transmission data size.

FIG. 21 is a block diagram showing an example of a function configuration of the navigation system 40' in the second embodiment. The navigation system 40' comprises the map data storage unit 41, the navigation processing unit 42, the control unit 43, the map data update unit 44, a radio communication unit 45, an update request transmission unit 46, an area information storage unit 47, and an acceptance unit 48. In addition, excluding points described below, because a configuration in FIG. 21 with a same reference numeral as in FIG. 13 has the same or similar function as in FIG. 13, its description will be omitted.

The navigation system 40' communicates with the nearest base station 18 by a radio communication, and thereby, communicates with the update information providing server 20' through the station 18. The update request transmission unit 46 transmits data to the update information providing server 20' through the radio communication unit 45, and the map data update unit 44 acquires the data through the communication unit 45. In the area information storage unit 47 is stored data similar to that of the area storage unit 31 described with reference to FIG. 12.

From a user, the acceptance unit 48 accepts information for indicating an area of an update object of map data, and priority information for indicating a data kind to be preferentially updated through the input device 17 such as a touch panel; and sends the received area information and priority information to the update request transmission unit 46.

When the update request transmission unit 46 receives the area information from the acceptance unit 48, the transmission unit 46 refers the area information storage unit 47 and converts the area information to that for indicating a mesh ID. Then the update request transmission unit 46 refers the map data storage unit 41, and acquires the version information of map data associated with the mesh ID for every data kind.

Then the update request transmission unit 46 makes a map data update request including the area information for indicating the mesh ID, the priority information, a line kind used by the radio communication unit 45, and the version information of the map data; and transmits the made map data update request to the update information providing server 20' through the communication unit 45.

When the map data update unit 44 receives update information from the update information providing server 20' through the radio communication unit 45, the update unit 44 updates map data for every data kind according to an order defined by update order information included in the update information. To be more precise, in the update order information, when a data kind is associated with a flag indicating "1," the map data update unit 44 reads replacement data associated with the data kind for every mesh ID of an update object from the received update information, and overwrites and updates corresponding map data in the map data storage unit 41 by the read replacement data.

Furthermore, in the update order information, when a data kind is associated with a flag indicating "0," the map data update unit 44 makes replacement data from map data associated with the data kind for every mesh ID of a mesh of an update object and stored in the map data storage unit 41, and incremental update data included in the update information; and overwrites and updates corresponding map data in the map data storage unit 41 by the made replacement data.

When the map data update unit 44 receives an error notification from the update information providing server 20', the update unit 44 displays a content thereof in a display device 16.

Figure 22:
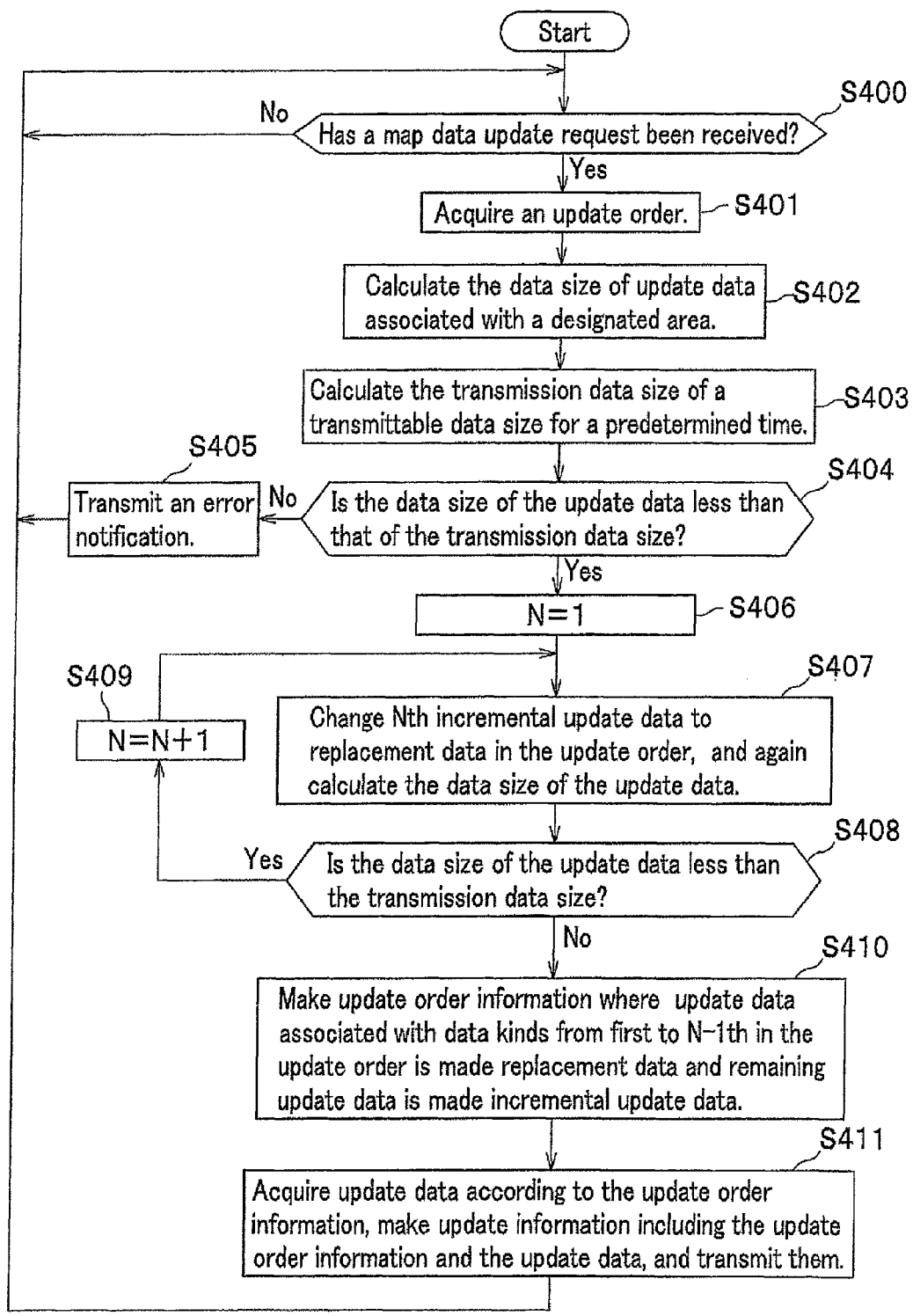
FIG. 22 is a flowchart showing an example of operations of the update information providing server in the second embodiment.

FIG. 22 is a flowchart showing an example of operations of the update information providing server 20' in the second embodiment. For example, at a predetermined time when power is turned on, the update information providing server 20' starts the operations shown in the flowchart.

Firstly, the update request receiving unit 23 determines whether or not to have received a map data update request through the communication line 11 (S400). When update request receiving unit 23 does not receive the map data update request (No in the S400), it repeats the step S400 until it receives the request. When the update request receiving unit 23 receives the map data update request (Yes in the S400), it sends priority information included in the map data update request, area information, and information for indicating the capacity of the recording medium 12, and sends the area information to the update information transmission unit 25.

Next, the update order information making unit 22 refers the priority information received from the update request receiving unit 23, and acquires an update order from the update order information storage unit 21 in a case of preferentially updating a data kind indicated by the priority information (S401). Then the update order information making unit 22 acquires incremental update data associated with a mesh ID for every data kind from the map data storage unit 24, based on the mesh ID indicated by the area information from the update request receiving unit 23. Then the update order information making unit 22 calculates the sum of a data size of incremental update data for every data kind with respect to the acquired incremental update data, further sums up the sum, and calculates the data size of update data (S402).

Then the update order information making unit 22 extracts incremental update data from a version indicated in version information received from the update request receiving unit 23 out of the acquired incremental update data, and calculates the sum of a data size for every data kind with respect to the extracted incremental update data. Then the update order information making unit 22 further sums up the sum of the data size for the every data kind, and calculates the data size of update data (S402).

Next the update order information making unit 22 refers the communication speed information storage unit 26, based on a line kind received from the update request receiving unit 23; extracts an average speed associated with the line kind; and calculates a transmission data size which is a transmittable data size for a predefined time in the line kind (S403).

Next, the update order information making unit 22 determines whether or not the data size of the update data is less than the transmission data size (S404). When the data size of the update data is not less than the transmission data size (No in the S404), the update order information making unit 22 transmits an error notification, which indicates that it is requested to narrow the area of an update object, to the navigation system 40' through the communication line 11 (S405); and the update request receiving unit 23 again performs the process indicated in the step S400.

When the data size of the update data is less than the transmission data size (Yes in the S404), the update order information making unit 22 initializes the variable N to "1" (S406), changes Nth incremental update data to replacement data with respect to the update order acquired in the step S401, and again calculates the data size of the update data (S407).

Next, the update order information making unit 22 determines whether or not the data size of the update data again calculated is less than the transmission data size (S408). When the data size of the update data again calculated is less than the transmission data size (Yes in the S408), the update order information making unit 22 increases the variable N by "1" (S409), and again performs the process indicated in the step S407.

When the data size of the update data again calculated is not less than the transmission data size (No in the S408), the update order information making unit 22 makes update order information where the update data of data kinds from first to N-1th is made replacement data in the update order, and that of a data kind other than the above is made incremental update data (S410).

Next, the update information transmission unit 25 refers a flag in the update order information, and with respect to a data kind where a flag indicating "1" is associated, extracts from the map data storage unit 24 replacement data associated with the area information received from the update request receiving unit 23; whereas, with respect to a data kind where a flag indicating "0" is associated, the transmission unit 25 extracts from the map data storage unit 24 incremental update data associated with the area information received from the update request receiving unit 23.

Then the update information transmission unit 25 makes the extracted replacement data and incremental update data to be update data, and makes update information including the update data and the update order information. Then the update information transmission unit 25 transmits the made update information to the navigation system 40' through the communication line 11 (S411), and the update request receiving unit 23 again performs the process indicated in the step S400.

Figure 23:
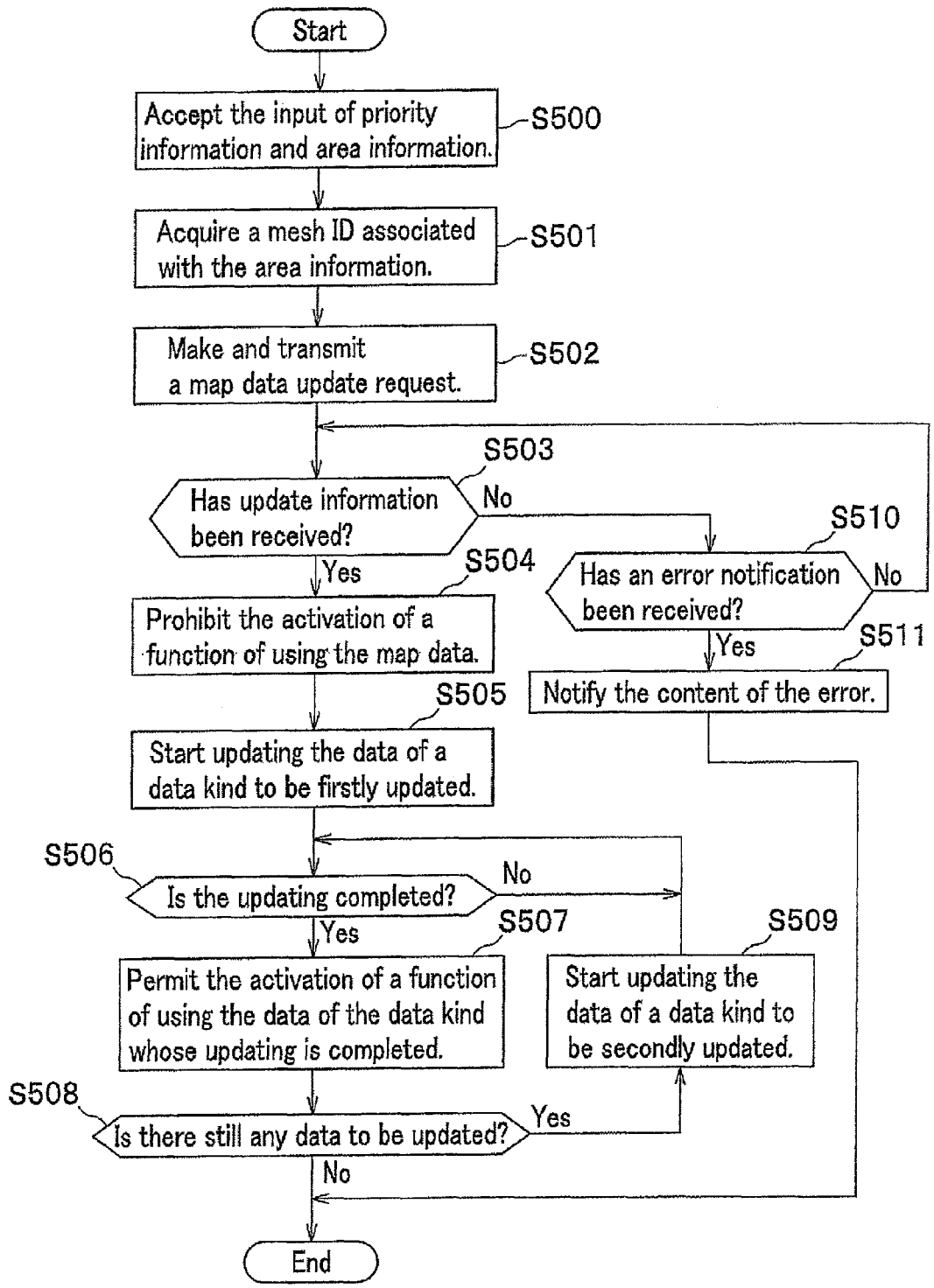
FIG. 23 is a flowchart showing an example of operations of the navigation system in the second embodiment.

FIG. 23 is a flowchart showing an example of operations of the navigation system 40' in the second embodiment. When the navigation system 40' is instructed to update map data by a user through the input device 17, the system 40' starts the operations shown in the flowchart.

Firstly, the acceptance unit 48 accepts area information and priority information from a user through the input device 17, and sends them to the update request transmission unit 46 (S500). Then when the area information is not a mesh ID, the update request transmission unit 46 refers the area information storage unit 47 and converts the area information to that indicating the mesh ID (S501).

Next the update request transmission unit 46 refers the map data storage unit 41 and acquires version information of map data associated with the mesh ID for every data kind. Then the update request transmission unit 46 makes a map data update request including the area information for indicating the mesh ID, the priority information, a line kind used by the radio communication unit 45, and the version information of the map data; and sends the made map data update request to the update information providing server 20' through the communication unit 45 (S502).

Next the map data update unit 44 determines whether or not to have received update information from the update information providing server 20' through the radio communication unit 45 (S503). When the map data update unit 44 does not receive the update information (No in the S503), it determines whether or not to have received an error notification (S510).

When the map data update unit 44 does not receive the error notification (No in the S510), it again performs the process indicated in the step S503. When the map data update unit 44 receives the error notification (Yes in the S510), it displays the content of the notification in the display device 16 (S511) and completes the operations shown in the flowchart.

When the map data update unit 44 receives the update information (Yes in the S503), it notifies the control unit 43 of update start of the map data. The control unit 43 instructs the navigation processing unit 42 to prohibit the activation of a function of using data in the map data storage unit 41 (S504). Then the map data update unit 44 specifies map data of a data kind to be firstly updated in the map data storage unit 41 according to update order information in the update information, and starts a process of updating the specified map data by update data in the update information (S505).

Then when the map data update unit 44 completes updating map data associated with one data kind (Yes in S506), the update unit 44 notifies the control unit 43 of the data kind whose updating is completed, and the control unit 43 instructs the navigation processing unit 42 to permits the activation of a function of using the map data associated with the data kind (S507). Then the map data update unit 44 refers the update order information in the update information, and determines whether or not there remains any data kind to be updated (S508).

When there remains any data kind to be updated (Yes in the S508), the map data update unit 44 specifies map data of a data kind to be secondly updated in the map data storage unit 41, starts a process of updating the specified map data by update data in the update information (S509), and again performs the process indicated in the step S506. When there remains no data kind to be updated (No in the S508), the navigation system 40' completes the operations shown in the flowchart.

Thus the second embodiment of the present invention has been described.

Also according to the embodiment, the update information providing system 10' can update map data in the navigation system 40' in order from data of a data kind designated by a user.

Figure 24:
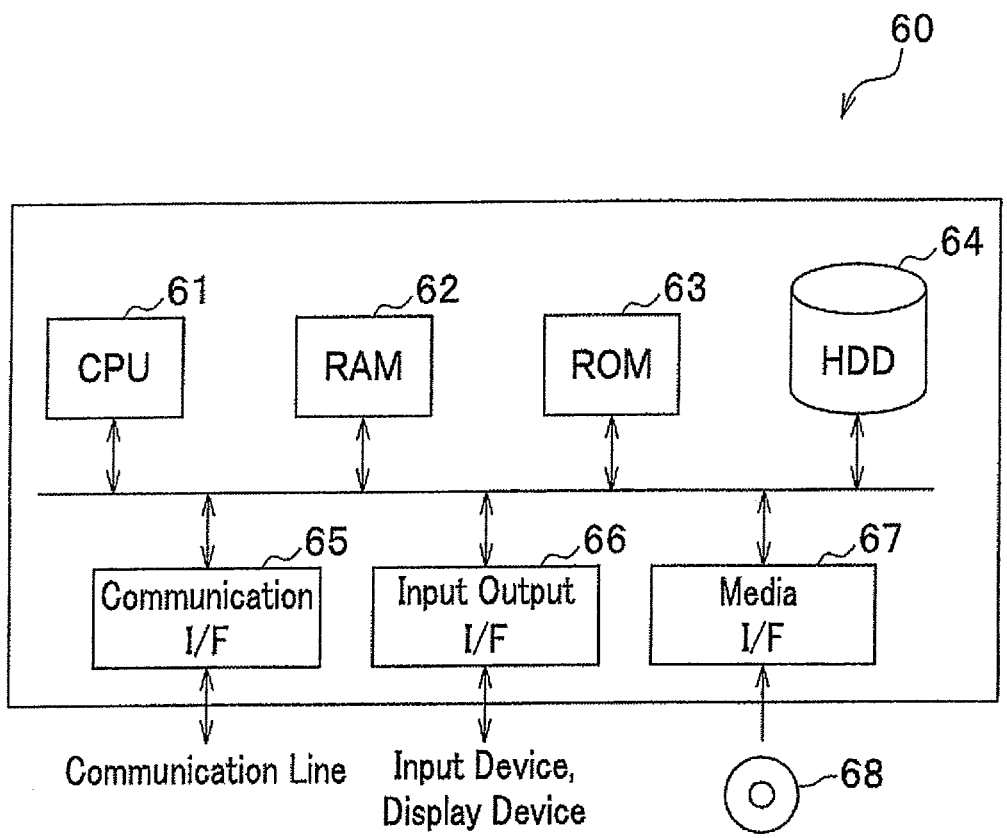
FIG. 24 is a hardware configuration drawing showing an example of a configuration of a computer achieving any function of an update information providing server, a user terminal, and a car navigation system.

In addition, any of the update information providing servers 20, 20', the user terminal 30, and the navigation systems 40, 40' in the first and second embodiments described above is achieved, for example, by a computer 60 with a configuration shown in FIG. 24.

FIG. 24 is a hardware configuration drawing showing an example of a hardware configuration of the computer 60 achieving any function of the update information providing servers 20, 20', the user terminal 30, and the navigation systems 40, 40'. The computer 60 comprises a CPU (Central Processing Unit) 61, a RAM (Random Access Memory) 62, a ROM 63, an HDD (Hard Disk Drive) 64, a communication interface (I/F) 65, an input/output interface (I/F) 66, and a media interface (I/F) 67.

The CPU 61 operates based on a program stored in any of the RAM 63 and the HDD64, and controls each unit described above. The ROM 63 stores a boot program performed by the CPU 61 at the activation of the computer 60, a program depending on the hardware of the computer 60, and the like.

The HDD 64 stores a program performed by the CPU 61. The communication interface 65 receives data from another instrument through a communication line, and transmits data generated by the CPU 61 to another instrument through the communication line. The CPU 61 controls an input device and an output device through the input/output interface 66. The CPU 61 acquires data from the input device through the input/output interface 66. In addition, the CPU 61 outputs generated data to the output device through the input/output interface 66.

The media interface 67 reads any of a program and data stored in a recording medium 68 and provides it to the RAM 62. A program provided to the CPU 61 through the RAM 62 is stored in the recording medium 68. The program is read from the recording medium 68, is installed in the computer 60 through the RAM 62, and is performed by the CPU 61. The recording medium 68 is, for example, any of: an optical recording medium such as a DVD and a PD (Phase change rewritable Disk); an optical magnetic recording medium such as an MO (Magneto-Optical disk); a tape medium; a magnetic recording medium; a semi-conductor memory; and the like.

When the computer 60 functions as the update information providing server 20 in the first embodiment, a program installed in the computer 60 and performed thereby makes the computer 60 function as the update order information storage unit 21, the update order information making unit 22, the update request receiving unit 23, the map data storage unit 24, and the update information transmission unit 25.

Furthermore, when the computer 60 functions as the update information providing server 20' in the second embodiment, a program installed in the computer 60 and performed thereby makes the computer 60 function as the update order information storage unit 21, the update order information making unit 22, the update request receiving unit 23, the map data storage unit 24, the update information transmission unit 25, and the communication speed information storage unit 26.

Furthermore, when the computer 60 functions as the user terminal 30, a program installed in the computer 60 and performed thereby makes the computer 60 function as the area information storage unit 31, the update request transmission unit 32, the update information recording unit 33, the acceptance unit 34, and the capacity detection unit 35.

Furthermore, when the computer 60 functions as the navigation system 40 in the first embodiment, a program installed in the computer 60 and performed thereby makes the computer 60 function as the map data storage unit 41, the navigation processing unit 42, the control unit 43, and the map data update unit 44. In addition, when the computer 60 functions as the navigation system 40 in the first embodiment, the communication interface 65 may not be provided to the computer 60.

Furthermore, when the computer 60 functions as the navigation system 40' in the second embodiment, a program installed in the computer 60 and performed thereby makes the computer 60 function as the map data storage unit 41, the navigation processing unit 42, the control unit 43, the map data update unit 44, the radio communication unit 45, the update request transmission unit 46, the area information storage unit 47, and the acceptance unit 48. In addition, when the computer 60 functions as the navigation system 40' in the second embodiment, the communication interface 65 comprises a function of performing a communication through a radio communication line.

Although the computer 60 reads these programs from the recording medium 68 and performs them, it may acquire them from another device through a communication medium in another example. The communication medium means a communication line or any of a digital signal and a carrier propagating through the communication line.

Furthermore, the present invention is not limited to the abovementioned embodiments, and various modifications thereof are possible within the spirit and scope of the invention.

For example, in each of the abovementioned embodiments, although the one of the update information providing server 20, 20' provides replacement data as update data in a range of a capacity of a recording medium designated from the user terminal 30, the present invention is not limited thereto. For example, even when any of the update information providing servers 20, 20' has a margin in the capacity of the recording medium designated from the user terminal 30, the server may be configured to provide incremental update data as the update data. If so, because update order information is provided such that a data kind designated from a user is firstly updated, it is possible to obtain an effect that map data is updated in the navigation systems 40, 40' in order from data of the data kind designated from him/her.

Furthermore, in the first embodiment, although the user terminal 30 detects the remaining capacity of the recording medium 12, where update data is recorded, and notifies the update information providing server 20 of the capacity, the user terminal 30 may notify, as another embodiment, the server 20' of a kind of the medium 12 (any of a CD-ROM, a DVD-R capable of one-layer recording, a DVD-R capable of two-layer recording, and the like) and decide the capacity of the medium 12 corresponding to the notified specification.

Furthermore, in each of the abovementioned embodiments, although the one of the update information providing servers 20, 20' stores an update order in advance for every data kind to be preferentially updated, the update order information may be made, as another embodiment, by a user through the user terminal 30.

What is claimed is:

1. An update information providing server for providing newest data of an updated portion in map data, the map data including a plurality of kinds of the map data, the server comprising:

a map data storage unit configured to store incremental update data and a data size of the incremental update data, for each of the plurality of kinds of the map data, the incremental update data being a difference between data of the updated portion at a predetermined time and the newest data of the updated portion;

an update order information storage unit configured to store a predetermined update order for each of the kinds of the map data, each predetermined update order indicating an order in which the plurality of kinds of the map data are to be updated, beginning with a kind of the map data associated with the predetermined update order for the kind of the map data to be preferentially updated;

an update request receiving unit configured to receive, from a user terminal, a map data update request including a capacity of a recording medium in which the updated portion is to be stored, and priority information specifying a first kind of the map data to be preferentially updated;

an update order information making unit configured to identify the incremental update data for each of the plurality of kinds of the map data when the update request receiving unit receives the map data update request, and to generate update order information specifying an update order associated with the first kind of the map data, when a total amount of the specified incremental update data is less than the capacity of the recording medium, the generated update order information being one of the each predetermined update orders; and an update information transmission unit configured to extract the incremental update data for each of the plurality of kinds of the map data from the map data storage unit, to generate update information including the extracted incremental update data and the update order information, and to transmit the update information to the user terminal.

2. The update information providing server according to claim 1, wherein the map data update request further includes area information that identifies an area in a map, wherein the map data storage unit stores the incremental update data and the data size thereof for every combination of the kind of the map data and the area information, and wherein when the update request receiving unit receives the map data update request, the update order information making unit is configured to identify the incremental update data in the map data storage unit, the incremental update data associated with an area designated by area information included in the map data update request, and when the total amount of the specified incremental update data is less than the capacity of the recording medium, the update order information making unit generates the update order information specifying an update order associated with the first kind of the map data for the combination of the identified incremental update data and the area information; and wherein the update information transmission unit is configured to extract the incremental update data associated with the designated area from the map data storage unit, to generate update information including the extracted incremental update data and the update order information.

3. The update information providing server according to claim 2,
wherein the map data storage unit further stores replacement data and a data size of the replacement data, which the replacement data is updated to newest data by being replaced for every combination of the kind of the map data and the area information,
wherein when the total amount of the identified incremental update data specified for every combination of the kind of the map data and the area information is less than the capacity of the recording medium, the update order information making unit further calculates a total amount of a data size of when the incremental update data associated with the first kind of the map data specified by the priority information is replaced with the replacement data associated with the first kind of the map data by referring to the map data storage unit, and when the calculated total amount is less than the capacity of the recording medium included in the map data update request, the update order information making unit further associates the kind of the map data to be firstly updated with a flag indicating the replacement data; and
wherein the update information transmission unit extracts the replacement data associated with the flag in the update order information instead of the incremental update data with respect to the kind of the map data associated with the flag, extracts the incremental update data from the map data storage unit with respect to the kind of the map data not associated with the flag, and generates update information including the extracted replacement data and the extracted incremental update data as well as the update order information.

4. The update information providing server according to claim 3,
wherein the total amount of the incremental update data specified for every combination of the kind of the map data and the area information is less than the capacity of the recording medium; and
wherein when the incremental update data associated with the first kind of the map data specified by the priority information in the specified incremental update data is replaced with the replacement data associated with the incremental update data, and the total amount of the data size is less than the capacity of the recording medium, the update order information making unit further associates the kind of the map data, which is associated with the incremental update data, with the flag if there exists the incremental update data whose total amount of the data size is less than the capacity of the recording medium.

* * * * *